United States Patent
Gerez et al.

(10) Patent No.: US 10,359,339 B2
(45) Date of Patent: Jul. 23, 2019

(54) MONITORING SYSTEM FOR AN ENGINE TEST BENCH

(75) Inventors: Valerio Gerez, Yerres (FR); Jerome Henri Noel Lacaille, Rosny Sous Bois (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 1231 days.

(21) Appl. No.: 13/878,107

(22) PCT Filed: Sep. 30, 2011

(86) PCT No.: PCT/FR2011/052284
§ 371 (c)(1),
(2), (4) Date: Apr. 5, 2013

(87) PCT Pub. No.: WO2012/049396
PCT Pub. Date: Apr. 19, 2012

(65) Prior Publication Data
US 2013/0211768 A1 Aug. 15, 2013

(30) Foreign Application Priority Data
Oct. 11, 2010 (FR) .................... 10 58236

(51) Int. Cl.
*G01M 15/02* (2006.01)
*G01M 15/05* (2006.01)

(52) U.S. Cl.
CPC ............ *G01M 15/02* (2013.01); *G01M 15/05* (2013.01)

(58) Field of Classification Search
CPC .................................................. G01M 15/02
See application file for complete search history.

(56) References Cited

U.S. PATENT DOCUMENTS

| 4,821,217 A | 4/1989 | Jackson et al. |
| 7,403,850 B1 | 7/2008 | Boutin et al. |
| 2010/0063674 A1 | 3/2010 | Karolak |
| 2012/0148400 A1 | 6/2012 | Gerez et al. |
| 2013/0197747 A1 | 8/2013 | Tourin et al. |
| 2013/0211768 A1 | 8/2013 | Gerez et al. |
| 2013/0239653 A1 | 9/2013 | Nicq et al. |

FOREIGN PATENT DOCUMENTS

| CN | 103154693 | 6/2013 |
| EP | 1 195 593 A1 | 4/2002 |

(Continued)

OTHER PUBLICATIONS

English machine translation of EP 1281948, retrieved Sep. 8, 2016.*

(Continued)

*Primary Examiner* — John E Breene
*Assistant Examiner* — Jeffrey C Morgan
(74) *Attorney, Agent, or Firm* — Oblon, McClelland, Maier & Neustadt, L.L.P.

(57) ABSTRACT

A monitoring method and system for a test bench for at least one engine component, including: an acquisition mechanism to acquire time signal packets corresponding to measurements of endogenic and exogenic parameters specific to the combination of the test bench and the engine component, at successive instants; and a processor to construct an endogenic indicator vector and an associated exogenic indicator factor at each instant of the successive instants, using time signal packets earlier than the instant, to identify a context class for the exogenic indicator vector, and to calculate a risk probability of the endogenic indicator vector conditioned by the identified context class for the associated exogenic indicator vector using at least one anomaly detector, to produce a diagnostic of a state of the test bench and engine component combination.

16 Claims, 5 Drawing Sheets

(56) References Cited

FOREIGN PATENT DOCUMENTS

| EP | 1 281 948 A1 | 2/2003 |
|---|---|---|
| EP | 1 715 165 A2 | 10/2006 |
| EP | 2627982 A | 8/2013 |
| FR | 2 968 038 A1 | 6/2012 |
| FR | 2 986 269 A1 | 8/2013 |
| FR | 2 988 130 A1 | 9/2013 |
| FR | 2 997 451 A1 | 5/2014 |
| GB | 249971 | 4/1926 |
| JP | 2013-542432 A | 11/2013 |
| WO | WO 2012/049396 A1 | 4/2012 |
| WO | WO 2014/064396 A2 | 5/2014 |

OTHER PUBLICATIONS

U.S. Appl. No. 13/302,054, filed Nov. 22, 2011, 2012-0148400, Gerez et al.
U.S. Appl. No. 13/754,186, filed Jan. 30, 2013, 2013-0197747, Tourin et al.
U.S. Appl. No. 13/792,537, filed Mar. 11, 2013, 2013-0239653, Nicq et al.
International Search Report dated Feb. 1, 2012 in PCT/FR2011/052284.
Jérôme Lacaille, "Standardized Failure Signature for a Turbofan Engine", IEEE Aerospace Conference, Big Sky, MT, 2009, 8 pages.
Jérôme Lacaille, "Validation of Health-Monitoring Algorithms for Civil Aircraft Engines", IEEE Aerospace Conference, Big Sky, MT, 2010, 11 pages.
A. P. Dempster, et al., "Maximum Likelihood from Incomplete Data via the EM Algorithm", Journal of the Royal Statistical society, 39(1):1-38, 1977, 38 pages.
U.S. Appl. No. 14/575,096, filed Dec. 18, 2014, Gerez.
U.S. Appl. No. 13/878,107, filed Apr. 5, 2013, 2013-0211768, Gerez, et al.
U.S. Appl. No. 14/438,129, filed Apr. 23, 2015, Lacaille, et al.

\* cited by examiner

MONITORING SYSTEM FOR AN ENGINE TEST BENCH

TECHNICAL FIELD

This invention relates to the domain of engine test bench monitoring systems. The engine may be of any type and it may be designed for installation in land, sea or aerospatial vehicles. The information disclosed in this invention is applicable to an aircraft engine, although this example is not limitative.

STATE OF PRIOR ART

Engines use very sophisticated technologies and are systematically tested on test benches. During a test on a test bench, the engine or engine components and the bench are monitored using a large number of sensors. Some tests in the engine development phase may require recording of more than a thousand measurements including performance measurements at low frequency up to 100 Hz (for example pressures, temperatures, gauges, etc.), dynamic measurements at high frequency up to 50 kHz (for example measurements output from accelerometers, microphones, etc.) and some measurements or data describing the test procedure.

At the present time, there is a control system called SPC (Statistic Process Control) capable of recording measurements from each sensor (at different acquisition frequencies) and presenting measurement graphs in real time with warning or safety thresholds.

However, this SPC testing system simply collects monitored measurements and verifies that they remain between two safety thresholds. Since variations in the measurement context are not taken into account, the safety thresholds of the SPC test system must necessarily be very large. Thus, it is very difficult for such a system to detect an operating error and it simply protects the test bench by triggering warnings in the case of a very serious failure.

However, test bench operators usually try to test the engine under extreme operating conditions. This can create safety problems and serious risks of damaging the bench which is very expensive, which can cause engine development delays.

The purpose of this invention is to disclose a system for monitoring a test bench capable of precisely and safely monitoring operation of the test bench and the engine or component of the engine under test.

PRESENTATION OF THE INVENTION

This invention is defined by a monitoring system for a test bench for at least one engine component comprising:
  acquisition means to acquire time signal packets corresponding to measurements of endogenic and exogenic parameters specific to the test bench and engine component combination, at successive instants,
  processing means to construct an endogenic indicator vector and an associated exogenic indicator factor at each instant of said successive instants, using time signal packets earlier than said instant,
  processing means to identify a context class for said exogenic indicator vector, and
  processing means to calculate a risk probability of said endogenic indicator vector conditioned by said identified context class for said associated exogenic indicator vector using at least one anomaly detector, in order to produce a diagnostic of the state of said test bench and engine component combination.

Thus, this monitoring system is a self-adaptive system capable of managing a changing and multi-contextual environment. The system adapts to changing configurations by automatically detecting context changes so as to enable the anomaly detector to make a local diagnostic of measurements to be monitored as a function of the identified context.

The use of an anomaly detector on a test bench also helps to validate it before it is used, for example on an onboard engine.

Advantageously, the monitoring system comprises:
  processing means to construct a set of context classes starting from a sequence of initial exogenic indicator vectors during a learning phase, and
  processing means to update said set of context classes during an execution phase, starting from new exogenic indicator vector inputs.

Thus, starting from context data, the system learns to perform an automatic and unsupervised classification of contexts in order to identify the different operating modes of the test bench and engine component combination. This enables the monitoring system to manage all random manoeuvres that may be applied to the engine under test or an engine component under test.

Advantageously, the processing means are configured to update said set of context classes by checking if a new detection of an exogenic indicator vector belongs to a previously constructed context class, and recording the exogenic indicator vector of the new detection in a database if there is no context class that corresponds to the new detection until an appropriate number of similar exogenic indicator vectors have been detected to form a new context class.

Thus, the system continuously relearns to improve the unsupervised classification of contexts in order to achieve a stable and fairly robust classification after a certain time.

Furthermore, processing means are configured to update said set of context classes verifying if new detections of exogenic indicator vectors belong to previously constructed context classes and recording at least some of said new detections in the corresponding context classes.

For example, this makes it possible to regularly make a new update of each class in order to take account of slow changes to operating modes in order to further improve monitoring of the test bench and engine component combination.

Advantageously, the processing means are configured to identify the context class of an exogenic indicator vector by calculating a match value of said exogenic indicator vector relative to each context class.

The match value is used to verify whether new detections of exogenic indicator vectors resemble vectors that have already been used for learning. Thus, the match value is a credible and quantifiable indication about whether an exogenic indicator vector belongs to a context class and which quickly becomes more reliable over time. Consequently, when the match value becomes high enough, the monitoring system can begin to make precise and relevant diagnostics.

According to one aspect of this invention, the processing means are configured to construct said set of context classes using a likelihood maximisation criterion.

This iterative criterion can be used to fairly quickly obtain a precise context dependent classification.

According to another aspect of this invention, the processing means are configured to select an appropriate number of context classes based on optimisation criterion applied to the exogenic indicator vectors.

This is used to determine an optimum number of classes to obtain an optimum classification of operating modes.

Advantageously, the monitoring system comprises:
buffer memories to buffer at least one packet of time signals earlier than said instant, for each endogenic or exogenic parameter,
processing means to smooth each of said time signal packets according to at least one scale to form curves representative of said packets,
processing means to re-sample said representative curves, and
processing means to compress said re-sampled curves to construct said endogenic or exogenic indicator vector.

As a result, data flows output from the test bench and engine component combination can be reliably transformed into indicator vectors that take account of local and global variations of measurements, and thus producing an unsupervised, adaptative and precise classification of operating modes.

Advantageously, the processing means are configured to calculate a quality value of said risk probability.

This can then be used to evaluate the relevance of the risk probability, in a quantifiable manner.

According to a first example, the anomaly detector implements a normal behaviour model and generates a normality measurement (score) by a likelihood calculation.

Abnormal operations of the test bench and the engine can thus be detected.

According to a second example, the anomaly detector implements a bearing damage detection model.

This second detector can work offline, possibly regularly, to produce a diagnostic of wear and damage of test bench and engine bearings.

According to a third example, the anomaly detector implements an intermittent events detection model.

This third detector is capable of detecting the occurrence of intermittent vibration events in the test bench and the engine.

Advantageously, the monitoring system comprises supervision means in which said anomaly detectors are encapsulated, said supervision means being configured to start said anomaly detectors, to procure input data for each of said anomaly detectors, to receive output messages from each of said anomaly detectors and to manage instances corresponding to parameter settings and calibration choices for each of said anomaly detectors.

This enables simple and efficient management of the different anomaly detectors and the different engines or engine components that can be installed in the test bench at different times.

The invention also relates to a management system comprising a control system connected to an engine test bench, the control system being configured to control the test bench and to record data output from the test bench and at least one component of an engine in a storage means, the management system also comprising a monitoring system according to any one of the previous characteristics, said monitoring system being connected to the test bench through the control system that sends said data to it output from the test bench and engine component combination.

This avoids disturbance to operation of the test bench. For example, the control system can be deployed in a first computer and the monitoring system can be deployed in a second computer at a distance from the first.

The invention also relates to a method of monitoring a test bench for at least one engine component, comprising the following steps:
acquire time signal packets at successive instants corresponding to endogenic and exogenic parameter measurements specific to the test bench and engine component combination,
at each instant of said successive instants, use packets of time signals earlier than said instant to construct an endogenic indicator vector and an associated exogenic indicator vector,
identify a context class for said exogenic indicator vector, and
use at least one anomaly detector to calculate a risk probability of said endogenic indicator vector conditioned by said identified context class for said associated exogenic indicator vector in order to produce a diagnostic of the state of said test bench and engine component combination.

The invention is also related to a computer program comprising code instructions for implementation of the method according to the claim when it is executed by a computer.

DETAILED PRESENTATION OF PARTICULAR EMBODIMENTS

The basic concept of the invention is to propose a test bench monitoring system using monitoring mechanisms designed for onboard aircraft engines. These monitoring mechanisms (onboard) are configured to detect anomalies, knowing engine operating modes in advance.

It should be noted that an onboard engine always operates in the same way following clearly defined flight phases, as follows: start engine, taxi, take off, climb, cruise, approach, landing, reverse and stop engine. Thus, it is easy to identify engine operating modes by fairly simple indicators based on elementary criteria such as engine speed, altitude and aircraft attitudes.

However, operation of a machine (in other words an engine component or the entire engine) on a test bench may be very uncertain. For reasons of conciseness, the expression "engine component" will be used throughout the remainder of this description to denote the entire engine or simply an engine component.

The manoeuvres applied to an engine component installed on a test bench may be very changing, unpredictable and may include extreme conditions. Furthermore, there is often a need to test new equipment. Thus, it is impossible to predict or classify operating modes of the test bench and the engine component in advance and consequently, normal onboard aircraft engine monitoring mechanisms cannot operate in such an environment.

Therefore one purpose of this invention is to make an unsupervised classification and an automatic identification of contexts in an environment consisting of a test bench and an engine component.

Figure 1:
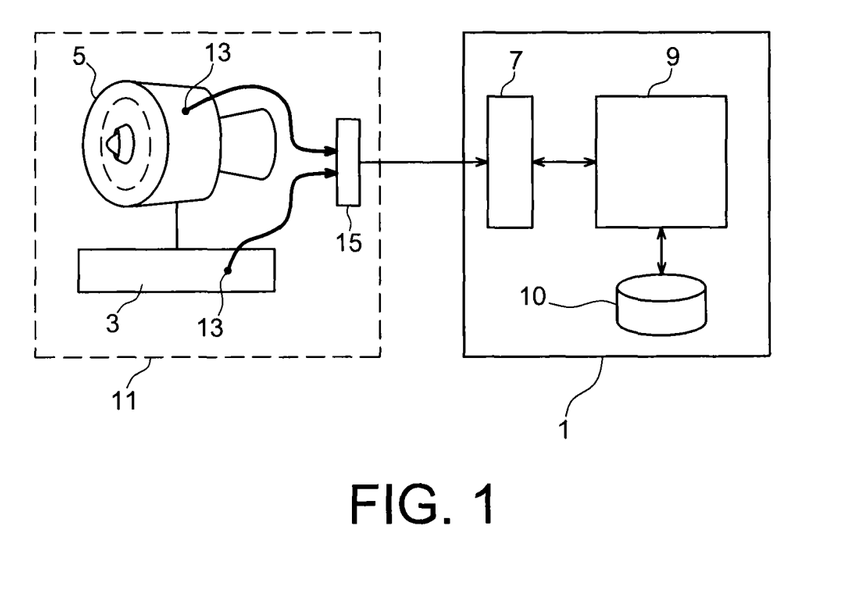
FIG. 1 diagrammatically shows a monitoring system for a test bench for at least one engine component according to the invention.

FIG. 1 diagrammatically shows a monitoring system 1 for a test bench 3 of at least one component 5 of an aircraft engine, according to the invention. This system 1 comprises data acquisition means 7 and information processing means 9 such as a computer to execute one or several computer programs including program code instructions stored in storage means 10 of the computer and designed to use the monitoring system of the combination 11 of the test bench 3 and the engine component 5.

The engine component 5 is mounted in the test bench 3 and a large number of sensors 13 (a few hundred) are used to acquire measurements on the test bench 3 and on the engine component 5. These measurements are retrieved in the form of digital channels through acquisition buses or channels 15 at constant frequencies and are transmitted to the monitoring system 1. Some measurements (for example vibration measurements) are recorded at high frequency (of the order of 50 kHz) while other measurements (for example pressure measurements) are recorded at low frequency (about 1 Hz to 100 Hz).

Considering that the number of measurements made on the combination 11 of the test bench 3 and the engine component 5 may be very high (several hundred), it is advantageous to not process all measurements simultaneously. Thus, the set of measurements can be subdivided into subsets of measurements related to different elements of the combination 11 of the test bench 3 and the engine component 5 based on criteria produced by expertise.

For example, one important element to be monitored is the shaft line that corresponds to mechanical coupling between the test bench 13 and the engine 5 knowing that the engine is driven in rotation by a shaft that is turned by the bench 3. Thus, in this example, the subset of measurements relative to the shaft line is selected, possibly comprising low frequency measurements (for example rotation speeds, pressures, temperatures, etc.) and high frequency measurements (for example accelerations, displacements).

Note also that the measurements comprise measurements of endogenic and exogenic parameters. An exogenic parameter is a context dependent parameter that is representative of the context (in other words the operating mode or functional conditions) of the combination 11 of the test bench 3 and the engine component 5. On the other hand, an endogenic parameter is a parameter that can be observed and is to be monitored and analysed as a function of its observation context to detect an anomaly. Endogenic parameter and exogenic parameters may be identified based on criteria produced by expertise.

Considering the example of the shaft line, exogenic parameter measurements comprise rotation speeds, inlet air pressures, temperatures, etc. On the other hand, endogenic parameter measurements comprise vibration measurements, energies, shaft displacements, unbalanced masses, etc. Obviously information about energy or unbalanced mass is quite different in different contexts.

According to the invention, the monitoring system 1 is configured to transform flows of parameter measurement data from combination 11 of the test bench 3 and the engine component 5 into indicators to identify contexts automatically and to detect anomalies as a function of the context.

More particularly, acquisition means 7 are configured to acquire time signal packets corresponding to measurements of endogenic and exogenic parameters specific to the combination 11 of the test bench 3 and the engine component 5 at successive instants (for example at regular instants).

At each instant among the successive instants, the processing means 9 are configured to construct an endogenic indicator vector and an associated exogenic indicator vector starting from packets of time signals earlier than the current instant. An endogenic or exogenic indicator vector may be constructed by compressing time signal packets as described below with reference to FIG. 2. Thus, each indicator vector (endogenic or exogenic) may for example be calculated periodically from past data.

Furthermore, the processing means 9 are configured to identify a context class for the exogenic indicator vector constructed at the current instant.

A context class may be identified automatically for example by calculating distances of an exogenic indicator vector at the current instant relative to exogenic indicator vectors constructed at previous instants by defining the class by a determined number of the closest exogenic vectors.

As a variant, a context class may also be identified automatically without supervision but by analysing a class among a set of classes constructed by learning to which it belongs, as described below with reference to FIG. 3.

Thus, the processing means 9 can use at least one anomaly detector (for example designed for use on an onboard aircraft engine) to calculate a score or risk probability of the current endogenic indicator vector conditioned by the context class identified for the associated exogenic indicator vector in order to make a diagnostic of the state of the combination 11 of the test bench 3 and the engine component 5.

Advantageously, the processing means 9 are also configured to calculate a quality or precision value of the risk probability that can help to evaluate the relevance of the risk.

Figure 2:
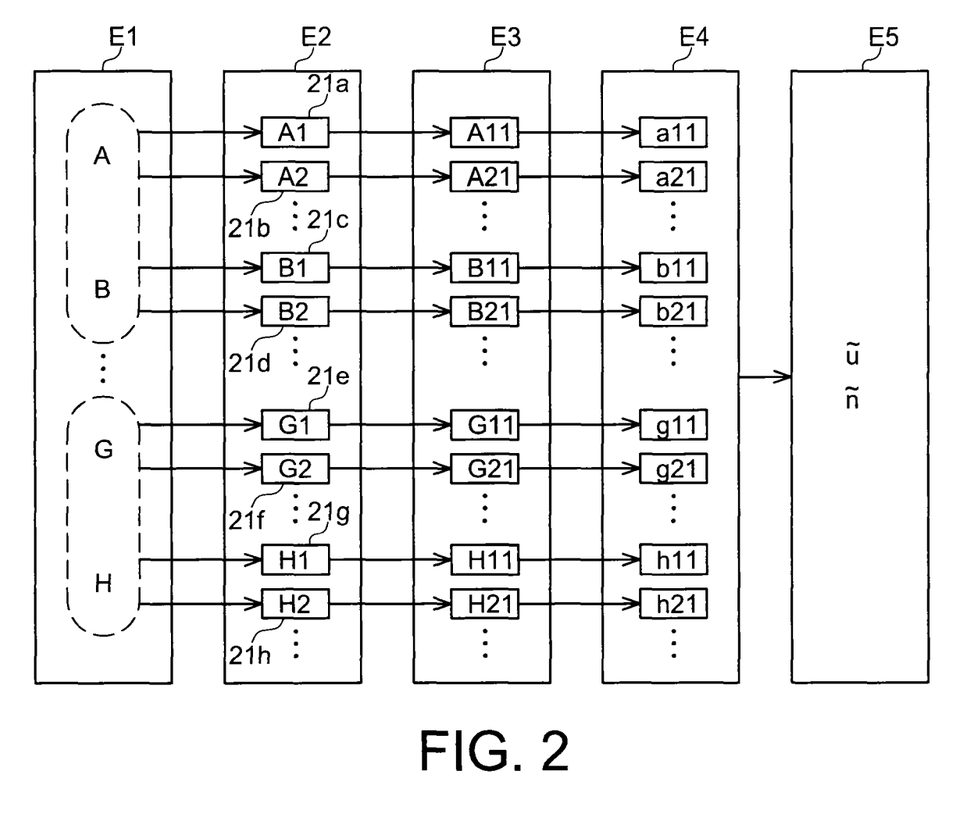
FIG. 2 is a flow chart according to one particular embodiment of the invention showing steps in the construction of an endogenic indicator vector and an associated exogenic indicator vector.

FIG. 2 is a flow chart according to one particular embodiment showing steps in the construction of an endogenic indicator vector and an associated exogenic indicator vector.

In step E1, the processing means 9 analyse time signal packets corresponding to measurements of parameters A, B, . . . , G, H received at successive instants and identify measurements of endogenic parameters A, B, etc. and exogenic parameters G, H, etc. The endogenic parameter measurements are used to construct endogenic indicator vectors and measurements of exogenic parameters are used to construct exogenic indicator vectors. For reasons of conciseness, the term "parameter" is used in the remainder of this description to denote either an "endogenic parameter" or an "exogenic parameter" indifferently, and similarly the term "indicator vector" is used to denote an "endogenic indicator vector" or an "exogenic indicator vector" indifferently.

In step E2, the time signal packets of the different parameter measurements are recorded in buffer memories 21a-21h at defined frequencies. More particularly, the processing means 9 are configured to buffer at least one packet of time signals earlier than the current instant in the variable size buffer memories 21, for each parameter.

Thus, for each parameter A, B, . . . , G, H, at least one time interval is defined to record the corresponding time signal. For example, for parameter A, the last ten seconds of the corresponding time signal may be recorded in a first buffer memory 21a and the last twenty seconds may be recorded in a second buffer memory 21b, etc. In other words, several buffer memories with different and/or the same sizes can be defined for each parameter.

According to the example shown in FIG. 2, a first time signal A1 and a second time signal A2 of parameter A are recorded in first and second buffer memories 21a, 21b, etc. Similarly, time signals B1, B2, . . . , G1, G2, H1, H2 of parameters B, . . . , G, H are recorded in buffer memories 21c, 21d, . . . , 21h respectively. In other words, several packets of corresponding signals can be buffered in several buffer memories 21a-21h, for each parameter.

In step E3, the processing means 9 are configured to smooth each packet of time signals at at least one scale to form curves A11, A21, . . . , H11, H12 representative of these packets. Smoothing is a convolution operation that creates a global or local representation of time signal packets at the chosen scale. Strong smoothing illustrates the variation or the global tendency of the signals, while weak smoothing determines the local behaviour of the signals.

In step E4, processing means are configured to re-sample the representative curves A11, A21, . . . , H11, H12 formed in the previous step. Once a smoothed curve is available, a few representative points corresponding to a first compression may be sufficient. Thus, at the end of this step, the time signal packets of each parameter A, . . . H are transformed into a sequence of re-sampled curves a11, a21, . . . , h21 that are small curves of a few points (for example of the order of about ten points).

More precisely, the previous steps E2 to E4 consist of defining the size n of a buffer memory (21a, . . . 21h), the re-sampling rate r, and the rank p of a mean polynomial filter a=[$a_0$, $a_1$, . . . , $a_p$], for a packet of time signals $x_t$ (in other words A1, or A2, . . . or, H2) at a current instant t of a given parameter (A, or B, . . . , or H). The re-sampled curve $Y_t$ (in other words a11, or a21, . . . , or h21) after these steps is then defined by $Y_t$=[$y_t$, $y_{t-r}$, . . . , $y_{t-(n-1)r}$] where $y_t$ is the convolution of $x_t$ by the filter a according to the following formula:

$$y_t = a * x = \sum_{i=0}^{p-1} a_i x_{t-i}.$$

In step E5, the processing means 9 are configured to compress the re-sampled curves a11, a21, . . . , h21 in order to construct the endogenic or exogenic indicator vector. Compression is done individually for each re-sampled curve $Y_t$ (in other words for each of the small curves a11, a21, . . . , h21).

For example, each re-sampled curve $Y_t$ can be compressed using a main component analysis. A first step consists of determining a normalised curve $\overline{Y}_t$=($Y_t$−$\mu_t$)/$\sigma_t$ by calculating the mean $\mu_t$ and the variance $\sigma_t$ of all n points on the re-sampled curve $Y_t$. A basic change is then made by projecting each normalised curve $\overline{Y}_t$ on an orthonormal base of curves-models (or curve-templates) {$v_1$, $v_2$, . . . , $v_n$}, each curve-model $v_i$ being a basic vector with size n.

Each re-sampled curve $Y_t$ may then be expressed by a series of curves-models as follows:

$$y_t = \sum_{i=1}^{k} a_{t,i} v_i + \varepsilon_t.$$

In this equation, the values $\alpha_{t,1}$, $\alpha_{t,2}$, . . . , $\alpha_{t,k}$ are projection coefficients of, the normalised curve $\overline{Y}_t$ on the orthonormal base and $\varepsilon_t$ is the residual error of the compression when only the k first curves-models $v_1$ to $v_k$ (k≥0) are used. The main component analysis classifies the curves-models in order of importance and eliminates those that are not important or more precisely, groups together those for which there is a small variance in the remainder $\varepsilon_t$. As a result, the optimum set of curve-model $v_i$ with size k is obtained that minimises the norm of the remainder $\|\varepsilon_t\|$.

The re-sampled curve $Y_t$ can then be compressed by replacing these elements $y_t$, $y_{t-r}$, . . . , $y_{t-(n-1)r}$ by a mean $\mu_t$, a variance $\sigma^2$, and a few compression coefficients $\alpha_{t,1}$, $\alpha_{t,2}$, . . . , $\alpha_{t,k}$ that can be represented by a compression vector $\tilde{y}$=[$\mu_t$, $\sigma_t$, $\alpha_{t,1}$, . . . , $\alpha_{t,k}$].

The concatenation of all compression vectors $\tilde{y}_1$, $\tilde{y}_2$, . . . of all re-sampled curves a11, a21, . . . , h12 globally forms an indicator vector $\tilde{w}$=[$\tilde{y}_1$, $\tilde{y}_2$, . . . ]. In the following, an endogenic indicator vector is denoted $\tilde{x}$ and an exogenic indicator vector is denoted $\tilde{u}$. The endogenic indicator vector $\tilde{x}$ is then used to make a diagnostic in the framework of the context class identified by the exogenic indicator vector $\tilde{u}$.

Figure 3:
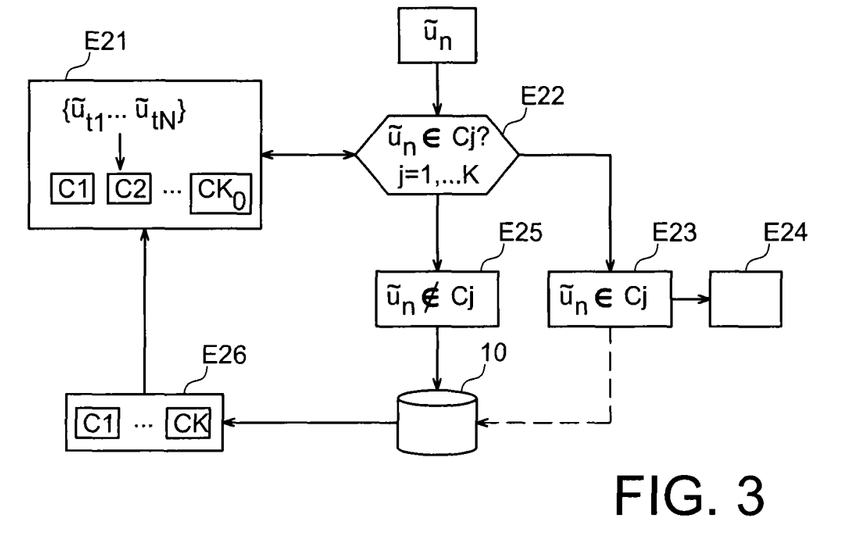
FIG. 3 is a flow chart according to one particular embodiment of the invention showing steps in the construction of a set of context classes.

FIG. 3 is a flow chart according to a particular embodiment showing steps in the construction of a set of context classes.

During a calibration phase (step E21), the processing means 9 are configured to construct an initial set of context class C1, C2, . . . , $CK_0$ starting from a learning sequence of initial exogenic indicator vectors {$\tilde{u}_{t1}$, $\tilde{u}_{t2}$, . . . , $\tilde{u}_{tN}$}. This construction is done without supervision, in other words, without any advanced knowledge of class names.

The processing means 9 are then configured in an execution phase (steps E22-E26) to update this set of context classes self-adaptively starting from new inputs of exogenic indicator vectors.

More particularly, in step E22 the processing means 9 are configured to verify if a new detection of an exogenic indicator vector $\tilde{u}_n$ belongs to a previously constructed context class. For example, this verification may be made by calculating a match value of the exogenic indicator vector $\tilde{u}_n$ relative to each of the context classes and identifying the class that gives the best match. The match concept is described in the publication by J. Lacaille "*Validation of health monitoring algorithms for civil aircraft engines, IEEE Aerospace Conference, Big Sky, Mont., 2010*". The match value may be considered as being the measurement of a distance between the exogenic indicator vector and a context class, and thus can be used to verify if the exogenic indicator vector of the new detection resembles vectors that have already been used for learning. If the test in step E22 is positive, then the operation proceeds to step E23, otherwise step E25 will be started.

Step E23 concerns identification of the context class. If the exogenic indicator vector $\tilde{u}_n$ of the new detection belongs to a previously constructed context class, then this belonging identifies the context class and is used to make diagnostics in step E24 using an anomaly detector. Advantageously, at least some of these new detections of exogenic indicator vectors are recorded in the database 10 so that they can then be recorded in the corresponding context classes.

On the other hand, if the new detection does not correspond to any existing context class, then the exogenic indicator vector $\tilde{u}_n$ of the new detection is recorded in the database 10 in step E25, until an appropriate number of similar exogenic indicator vectors have been detected to form a new context class.

In step E26, the exogenic indicator vectors recorded in the database 10 are used to update the context classes C1, C2, . . . , CK and to relearn the classification when the match between the exogenic indicator vectors and the existing classes is weak.

It can be seen that the set of context classes in steps E21 to E26 can be constructed using a maximisation likelihood criterion. In this case, it is assumed that the exogenic indicator vector ũ follows a normal distribution inside each context class, and an EM (Expectation-Maximisation) type maximisation criterion can be used that consists of identifying a mix of Gaussian densities (for example see the document by Dempster et al., "*Maximum likelihood from incomplete data via the EM algorithm Journal of the Royal Statistical society*, 39(1):1-38, 1977)". The EM method is an iterative process that converges towards a model of coefficients for Gaussian class identifier laws. A class identifier is used to calculate the match between an exogenic indicator vector and the class, and therefore to determine whether or not an exogenic indicator vector belongs to an existing class (see steps E23 and E25). The EM method also needs to be initialised with an initial number of classes.

Figure 4:
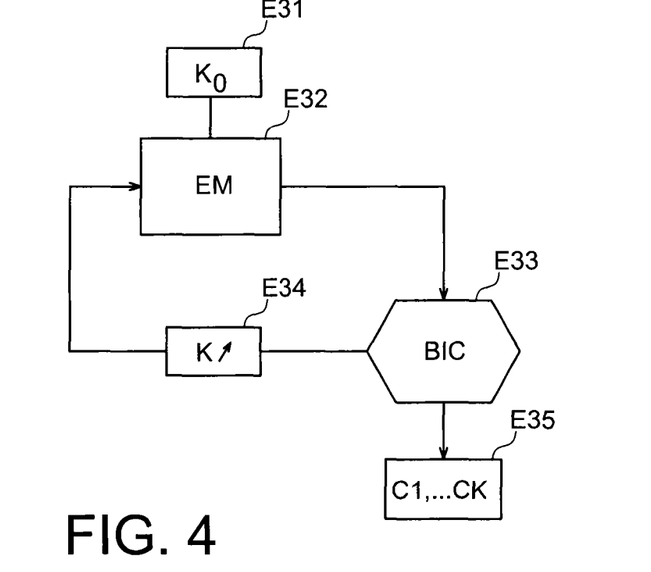
FIG. 4 is a flow chart showing steps to select an optimum number of context classes according to the invention.

FIG. 4 is a flow chart showing steps for selecting an optimum number of classes in the context of an EM type maximisation criterion.

In step E31, an initial number $K_0$ of context classes is fixed.

In step E32, a classification mechanism is used (for example EM) to construct context classes from detections of exogenic indicator vectors as shown in FIG. 3.

In step E33, an optimisation criterion is applied on exogenic indicator vectors to select the appropriate number of context classes. A likelihood coefficient is calculated, for example based on a likelihood criterion or a BIC (Bayesian Information Criterion) type criterion. This criterion corresponds to a conditional likelihood of exogenic indicator vectors relative to the number of classes. More precisely, the BIC criterion is defined as a function of the likelihood of exogenic indicator vectors $L(\tilde{u}_{t1}, \ldots, \tilde{u}_{tN})$, the number of classes K and the number of detections N according to the following formula:

$$BIC = -2 \log(L(\tilde{u}_{t1}, \ldots, \tilde{u}_{tN})) + K \log(N).$$

The method then consists of minimising the BIC coefficient. This coefficient reduces when the likelihood increases, but is penalised by the number K of classes.

If the likelihood coefficient is not minimal, then the number of context classes is increased (step E34) and the previous steps are restarted, by looping back to step E32.

On the other hand, if the likelihood coefficient is minimal, then learning is stopped and then a fairly robust classification is obtained in step E35. This coefficient can thus be used to determine the best number of classes to reach an optimum classification. For example, the number K of classes is of the order of ten and the number N of detections is of the order of a hundred.

A robust classification can create a stochastic contexts law model and consequently create a high precision diagnostic of the state of the test bench and the engine component. Let U be the random variable of exogenic indicator vectors and X the random variable of endogenic indicator vectors and assume that at instant t, the detection of exogenic and endogenic indicator vectors is $(\tilde{u}_t, \tilde{x}_t)$, then the identification of the context class is determined by calculating the match probability $A(t) = P(U \approx \tilde{u}_t)$ which in this case corresponds to the likelihood of the exogenic indicator vectors $\tilde{u}_t$ relative to the context model.

The anomaly detector then calculates the risk probability R(t) and a precision Pr(t) or a quality value of the risk at instant t, according to the following formulas:

$$R(t) = 1 - P(X = x_t / U \approx \tilde{u}_t)$$

and $$Pr(t) = \mathrm{tr}[\mathrm{var}(X / U \approx \tilde{u}_t)].$$

An example of an anomaly detector for an aircraft engine is described in the publication by J. Lacaille "*Standardized failure signature for a turbofan engine IEEE Aerospace Conference, Big Sky, Mont.*, 2009". This anomaly detector is composed of two blocks. The first block standardises and normalises the indicators eliminating local dependences relative to the acquisition context while managing stochastic interdependence relations between the indicators themselves. The second block consists of modelling indicators and calculating an anomaly score or a risk probability R(t) starting from the likelihood of the model. The score may be obtained from the remainder of a generalised linear regression. Furthermore, an estimator of the conditional variance of the model is used to define the precision Pr(t) or the reliability of the calculated risk.

An anomaly may be confirmed after several successive detections and possibly after corroboration by various anomaly sources. If the anomaly is confirmed, the monitoring system 1 trips or issues a warning message.

It will be noted that the anomaly score may also be associated with a class number and possibly a label. Labelling of anomalies and damage from anomalies within each class can be defined by expertise.

Figure 5:
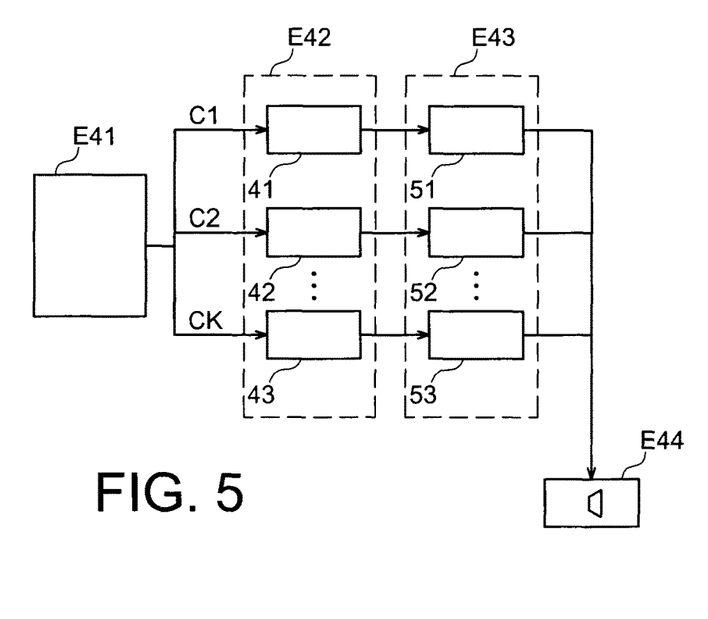
FIG. 5 is a flow chart showing an example encapsulation of anomaly detectors in the monitoring system according to the invention.

FIG. 5 is a flow chart showing an example encapsulation of anomaly detectors in the monitoring system 1.

According to this example, an anomaly detector is used for each context class C1, . . . , CK.

The input data to step E41 consists of segments of first time data to be monitored (in other words time signal packets corresponding to endogenic parameter measurements) and a second input (in other words time signal packets corresponding to exogenic parameter measurements) is associated with each first input data describing context-sensitive aspects of the functioning in progress. The first and second input data at a current instant t are transformed into exogenic and endogenic indicator vectors ($\tilde{u}_t$, $\tilde{x}_t$). The exogenic indicator vector is used to identify the context class or functioning mode as described above.

In step E42, a finer compression 41-43 is made on the time data to be monitored that are specific to each identified context class. In this case, compression is fairly easy because data belong to the same class and are more similar.

In E43, an anomaly detector 51-53 is used for each context class C1, . . . , CK. Each generic anomaly detector 51-53 produces scalar information by a data table (between 0 and 1) that represents the risk of anomaly. This output is associated with the quality value giving an estimate of the relevance of the result (between 0 and 1).

A warning message is issued in step E44 if the anomaly is confirmed. For example, a warning is triggered if a first threshold is exceeded and this overrun is confirmed. Furthermore, an anomaly prognostic warning may be triggered if it is anticipated that a second threshold will be exceeded.

Advantageously, use of an anomaly detector in a test bench 3 can also Validate this detector before it is used on an onboard engine, which facilitates matters and reduces detector certification costs.

Note that several types of anomaly detectors can be used at low or at high input frequencies.

A first anomaly detector implements a normal behaviour model and makes a measurement (or score) of normality by a likelihood calculation. This first detector uses low frequency time data segments as input data. It is used to detect abnormal behaviour of endogenic indicator vectors according to the context classes thus detecting abnormal operation of the test bench 3 and the engine component 5.

A second anomaly detector implements a bearing damage detection model. It uses synchronous time segments of high frequency data (tachometers and accelerometers) that can be stored in files. After these files have been processed, the second detector generates a probability of an anomaly for each bearing and a detailed signature for each bearing.

A third anomaly detector implements an intermittent events detection model. This detector analyses vibration data acquired by segment, knowing that the response frequency is less than one response per segment. A warning message is sent when a confirmed intermittent event is detected. Another identification warning can be sent if the detection might lead to more precise information about the origin of the detected event.

Figure 6:
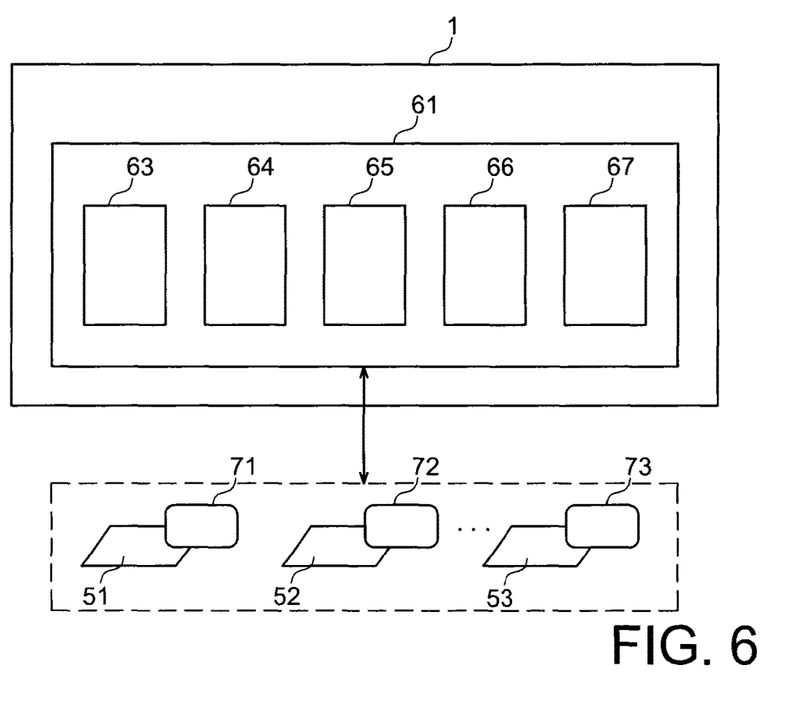
FIG. 6 diagrammatically shows encapsulation of anomaly detectors in the monitoring system according to the invention.

FIG. 6 diagrammatically shows encapsulation of anomaly detectors in the monitoring system.

The monitoring system 1 comprises supervision means 61 to encapsulate anomaly detectors 51, 52, 53 and to distribute the data and monitor the behaviour of each anomaly detector. These supervision means 61 comprise management means 63, data distribution means 64, parameter setting means 65, communication means 66 and display means 67. The management means 63 are configured to start anomaly detectors 51, 52, 53 and to manage instances 71, 72, 73 corresponding to parameter setting and calibration choices of each of these anomaly detectors. The data distribution means 64 are configured to procure and prepare input data for each of the anomaly detectors. The parameter setting means 65 are configured to adjust instance parameters. Communication means 66 are configured to receive, sort, select and read output messages from each anomaly detector. The display means 67 are configured to display the results.

Figure 7:
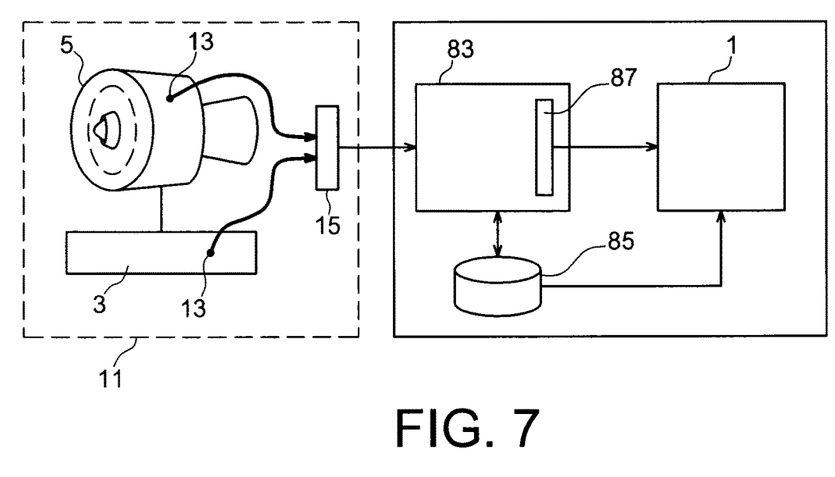
FIG. 7 diagrammatically shows a management system for the test bench for an engine component according to the invention.

FIG. 7 diagrammatically shows a management system for a test bench of an engine component according to the invention.

The management system 81 comprises a control system 83 connected to the test bench 3 of an engine component 5 and a monitoring system 1. The control system 83 is configured to control the test bench 3 and to record data output from the test bench 3 and the engine component 5 in storage means 85. Furthermore, the monitoring system 1 is connected to the combination 11 of the test bench 3 and the engine component 5 through the control system 83 and through a data bus 87 that transmits data to it output from the combination 11 of the test bench 3 and the engine component 5. This configuration is such that the functioning of the test bench is not disturbed.

For example, the control system 83 can be deployed in a first computer and the monitoring system 1 can be deployed in a second computer at a distance from the first.

The invention also relates to a computer program product that can be used in the different elements of the monitoring system, these programs comprising code instructions adapted to application of a method according to the invention as described above.

Note that the computer programs may include the following variables or parameters:
- parameters describing the names of the measurements to be read in input, their acquisition frequency and the size of buffer memories (duration of segments or data packets and time between two packets);
- a "confirmation" parameter specifying the number of successive tests to be done before a warning is issued;
- a threshold parameter specifying the value of a confirmed anomaly at which a warning should be sent;
- a confidence parameter specifying the minimum mean confidence threshold on observations used for confirmation to send a warning; and
- a "horizon" parameter, specifying if an anticipated degradation should be studied and when.

The invention claimed is:

1. A self-adaptive monitoring system adapted for monitoring a test bench and at least one aircraft engine component installed on the test bench and mechanically coupled to the test bench via a shaft, comprising:
   sensors provided on the test bench and provided on the engine component, the sensors configured to acquire measurements recorded at high frequency and measurements recorded at low frequency; and
   a processor configured to
      acquire time signal packets corresponding to measurements of endogenic and exogenic parameters specific to a combination of the test bench and the at least one aircraft engine component including a shaft line corresponding to a mechanical coupling between the test bench and the at least one aircraft engine component, in which the at least one aircraft engine component is driven in rotation by the shaft that is turned by the bench, at successive instants;
      construct an endogenic indicator vector and an associated exogenic indicator vector at each instant of the successive instants, using time signal packets earlier than the instant;
      identify a context class for the exogenic indicator vector;
      calculate a risk probability of the endogenic indicator vector conditioned by the identified context class for the associated exogenic indicator vector using at least one anomaly detector, to produce a diagnostic of a state of the combination of the test bench and the at least one aircraft engine component; and
      issue a warning or tripping the monitoring system if an anomaly is confirmed.

2. A system according to claim 1, wherein the processor is further configured to:
   construct a set of context classes starting from a sequence of initial exogenic indicator vectors during a learning phase; and
   update the set of context classes during an execution phase, starting from new exogenic indicator vector inputs.

3. A system according to claim 2, wherein the processor is further configured to update the set of context classes by checking if a new detection of an exogenic indicator vector belongs to a previously constructed context class, and recording the exogenic indicator vector of the new detection in a database if there is no context class that corresponds to the new detection until an appropriate number of similar exogenic indicator vectors have been detected to form a new context class.

4. A system according to claim 2, wherein the processor is further configured to update the set of context classes, by verifying if new detections of exogenic indicator vectors belong to previously constructed context classes and recording at least some of the new detections in the corresponding context classes.

5. A system according to claim 2, wherein the processor is further configured to identify the context class of an exogenic indicator vector by calculating a match value of the exogenic indicator vector relative to each context class.

6. A system according to claim 2, wherein the processor is further configured to construct the set of context classes using a likelihood maximization criterion.

7. A system according to claim 2, wherein the processor is further configured to select an appropriate number of context classes based on an optimization criterion applied to the exogenic indicator vectors.

8. A system according to claim 1, further comprising:
buffer memories to buffer at least one packet of time signals earlier than the instant, for each endogenic or exogenic parameter; and
the processor is further configured to
smooth each of the time signal packets according to at least one scale to form curves representative of the packets;
re-sample the representative curves; and
compress the re-sampled curves to construct the endogenic or exogenic indicator vector.

9. A system according to claim 1, wherein the processor is further configured to calculate a quality value of the risk probability.

10. A system according to claim 1, wherein the anomaly detector implements a normal behavior model and generates a normality measurement by a likelihood calculation.

11. A system according to claim 1, wherein the anomaly detector implements a bearing damage detection model.

12. A system according to claim 1, wherein the anomaly detector implements an intermittent events detection model.

13. A system according to claim 1, further comprising supervision means in which each anomaly detector is encapsulated, the supervision means being configured to start each anomaly detector, to procure input data for each anomaly detector, to receive output messages from each anomaly detector, and to manage instances corresponding to parameter settings and calibration choices for each anomaly detector.

14. A management system comprising:
a control system connected to an engine test bench, the control system configured to control the test bench and to record data output from the test bench and at least one component of an aircraft engine in storage means; and
a monitoring system according to claim 1, the monitoring system being connected to the test bench through the control system that sends the data to the monitoring system output from the test bench and engine component combination.

15. A method of self-adaptively monitoring a test bench and at least one aircraft engine component installed on the test bench and mechanically coupled to the test bench via a shaft, comprising:
providing sensors on the test bench and on the engine component, the sensors being configured to acquire measurements recorded at high frequency and measurements recorded at low frequency;
acquiring time signal packets at successive instants corresponding to endogenic and exogenic parameter measurements specific to a combination of the test bench and the at least one aircraft engine component including a shaft line corresponding to a mechanical coupling between the test bench and the at least one aircraft engine component, in which the at least one aircraft engine component is driven in rotation by the shaft that is turned by the bench;
at each instant of the successive instants, using packets of time signals earlier than the instant to construct an endogenic indicator vector and an associated exogenic indicator vector;
identifying a context class for the exogenic indicator vector;
using at least one anomaly detector to calculate a risk probability of the endogenic indicator vector conditioned by the identified context class for the associated exogenic indicator vector to produce a diagnostic of a state of the combination of the test bench and the at least one aircraft engine component; and
issuing a warning or tripping if an anomaly is confirmed.

16. A non-transitory computer readable medium comprising executable code instructions for implementation of the method according to claim 15 when executed by a computer.

* * * * *